Patented Nov. 3, 1942

2,300,741

UNITED STATES PATENT OFFICE 2,300,741

METHOD OF PURIFYING 3-PICOLINE

Francis E. Cislak and William R. Wheeler, Indianapolis, Ind., assignors to Reilly Tar & Chemical Corporation, Indianapolis, Ind., a corporation of Indiana No Drawing. Application May 31, 1941, Serial No. 396,174

15 Claims. (Cl. 260—290)

Our invention relates to the purification of 3-picoline from such contaminants as 4-picoline and 2,6-lutidine with which it is commonly associated as ordinarily prepared from coal tar.

We have discovered that by subjecting the impure 3-picoline, containing 4-picoline and/or 2,6-lutidine, and sometimes containing the contaminants even in predominating amount, to catalytic partial oxidation in vapor phase with a mildly oxidizing oxygen-containing gas, we can obtain a selective oxidation in which the contaminants 4-picoline and 2,6-lutidine are partially oxidized while little or no oxidation occurs of the 3-picoline.

By this selective oxidation, we change the mixture from one in which the components are difficult to separate one from another to one in which the components are very easy to separate one from another. That is, a mixture of 3-picoline with either or both of 4-picoline and 2,6-lutidine is difficult to separate into its components, to get 3-picoline in substantially pure form, because all these components boil at very nearly the same temperature (about 143–144° C.); but after the selective oxidation that converts the 4-picoline and the 2,6-lutidine into partial-oxidation products, such for instance as pyridinecarboxylic acids, those partial-oxidation products have quite different properties, both chemical and physical, from the unoxidized 3-picoline, so that separation of the 3-picoline from the partially oxidized products may readily be effected by physical or chemical means.

Oxidation catalysts which have been found effective to produce the partial oxidation are the oxides of the elements of the A sub-groups of groups V and VI of the periodic system, either singly or mixed with one another. The catalytic effectiveness of these oxides may be varied by the addition of other oxides, such for instance as oxides of iron, nickel, manganese, or chromium.

The mildly oxidizing oxygen-containing gas is most conveniently and desirably air; but our invention is not limited to air, for we can use various other oxygen-containing gases, such for instance as mixed steam and air, or mixed carbon dioxide and oxygen.

We prefer to carry out our selective partial oxidation in continuous process. In so doing, we mix the impure 3-picoline in vapor phase with the mildly oxidizing oxygen-containing gas, desirably air, and pass the mixture over the oxidation catalyst, while maintaining suitable oxidation temperature. Any suitable apparatus for doing this may be used.

The mixture that is passed over the oxidation catalyst desirably contains a great excess of air (or other mildly oxidizing oxygen-containing gas)—preferably several times as much as is necessary for the desired oxidation. The temperature is an elevated temperature, in comparison with room temperature; but varies with the nature of the catalyst, and is controlled to give the desired selective partial oxidation and to prevent total combustion. The temperature is usually in the range between 250° and 500° C.; but the optimum temperature must be determined for each mixture by analysis of the product, and the working temperature adjusted to the value which gives optimum results.

After the selective partial oxidation has been done, the unreacted substituted pyridine base, which is now largely and may be practically wholly 3-picoline, is separated from the partial-oxidation products in suitable manner, by physical and/or chemical methods.

We have found one excellent catalyst to be a vanadium pentoxide catalyst prepared as follows:

A hot aqueous suspension of ammonium vanadate is sprayed on to small granules of silica, desirably between sand-grain size and pea-size, which are heated well above 100° C. After the spraying, the coated granules are calcined in air at about 400° C. for several hours.

These coated and calcined granules are placed in steel tubes in which the oxidation reaction is to take place, and the oxygen-containing gas is passed through such steel tubes.

Example 1

A mixture of about 62% of 3-picoline and 38% of 4-picoline—obtained as a refined picoline cut in the rectification of coal tar bases—is mixed with about 30 times its weight of air, and the whole is heated (either before or after the mixing) to about 350° C. This hot mixture of air and picolines in vapor phase is passed over the catalyst at a space velocity of about 2000, with the catalyst and the mixture of gases maintained at about 350° C. in any suitable manner. (By space velocity we mean the total volume of gas, measured at standard temperature and pressure, which passes through the tube per hour, divided by the volume of the catalyst.) As the mixture of air and picolines passes over the catalyst, partial oxidation occurs; but this partial oxidation is selective, in that it is mainly and indeed almost wholly of the 4-picoline and only very slightly of the 3-picoline. The partial oxidation of the 4-picoline produces mainly 4-pyridine carboxylic acid—otherwise called isonicotinic acid.

The product discharged from the reaction tube is treated to separate the unreacted picoline from the isonicotinic acid produced by the partial oxidation of the 4-picoline, and from other co-present material. This is most conveniently done by absorbing the picoline and the partial-oxidation products (mainly isonicotinic acid) in any suitable liquid (most conveniently water), as in a scrubber. Then the liquid from the scrubber is subjected to distillation to obtain a distillate consisting of water and the picoline, which is mainly if not substantially wholly 3-picoline. The picoline in this distillate may be recovered from the co-present water in any convenient manner; and is a very pure 3-picoline.

*Example 2*

A mixture of about 39% of 3-picoline, 23% of 4-picoline, and 38% of 2,6-lutidine—which is more easily obtained as a cut in the rectification of coal tar bases than is the two-component mixture of Example 1—is treated in vapor phase in substantially the same manner as is described in Example 1 for the mixture of 3-picoline and 4-picoline. When the mixture with air is passed in vapor phase over the catalyst, the partial oxidation which occurs is mainly of the 2,6-lutidine, and to a somewhat less extent of the 4-picoline, with only very slight oxidation of the 3-picoline. The product discharged from the reaction tube in this example includes a somewhat smaller percentage of 3-picoline in the total picoline than is the case in Example 1, and also includes some residual 2,6-lutidine; but the percentage of 3-picoline in the mixture of substituted pyridine bases is nevertheless greatly increased. The unreacted substituted pyridine bases in the product discharged from the reaction tube are absorbed and recovered as in Example 1; and if further purification is desired may be subjected to the procedure of Example 1 to get a highly pure 3-picoline.

*Example 3*

In either of the foregoing Examples 1 and 2, we may vary the catalyst. For instance, we may use a vanadium-iron catalyst; which is conveniently prepared by mixing an aqueous solution of ferric nitrate with an aqueous solution of vanadyl nitrate, in approximate molar proportions of about 1 to 24, and spraying it on to small inert granules, conveniently of silica, maintained at above 100° C.; and then calcining the sprayed granules in air, at about 400° C., for several hours.

We find that this vanadium-iron catalyst is rather more stable than the simple vanadium catalyst first referred to, in that it has less tendency to deteriorate in use.

Instead of a vanadium or vanadium-iron catalyst we may use a molybdenum catalyst or a chromium catalyst or a tungsten catalyst, prepared in the same general way as the vanadium catalysts; or may use other composite catalysts, such as vanadium-chromium, vanadium-molybdenum, chromium-tungsten, etc. In all these instances the actual catalysts will be the oxides of the metals named.

We claim as our invention:

1. The process of purifying 3-picoline that is contaminated by the co-presence of at least one of the substituted pyridine bases 4-picoline and 2,6-lutidine, which consists in subjecting the impure 3-picoline to catalytic partial oxidation in vapor phase with a mildly oxidizing oxygen-containing gas at elevated temperature in comparison with room temperature, and separating the unoxidized 3-picoline from oxidation products.

2. The step in the process of separating 3-picoline from co-present substituted pyridine bases of the class consisting of 4-picoline and 2,6-lutidine, which consists in subjecting the mixture in vapor phase to catalytic partial-oxidation at an elevated temperature in comparison with room temperature to oxidize the contaminant selectively with relation to the 3-picoline.

3. The process of separating 3-picoline from 4-picoline, which consists in subjecting a mixture of the two picolines to catalytic partial-oxidation in vapor phase with a mildly oxidizing oxygen-containing gas at elevated temperature in comparison with room temperature, and separating the unoxidized 3-picoline from the products of oxidation.

4. The process as set forth in claim 1, in which the oxidation catalyst essentially comprises an oxide of an element of the A sub-groups of groups V and VI of the periodic system.

5. The process as set forth in claim 1, in which the oxidation catalyst essentially comprises an oxide of vanadium.

6. The process as set forth in claim 1, in which the oxidation catalyst essentially comprises oxides of vanadium and iron.

7. The process as set forth in claim 2, in which the oxidation catalyst essentially comprises an oxide of an element of the A sub-groups of groups V and VI of the periodic system.

8. The process as set forth in claim 2, in which the oxidation catalyst essentially comprises an oxide of vanadium.

9. The process as set forth in claim 2, in which the oxidation catalyst essentially comprises oxides of vanadium and iron.

10. The process as set forth in claim 3, in which the oxidation catalyst essentially comprises an oxide of an element of the A sub-groups of groups V and VI of the periodic system.

11. The process as set forth in claim 3, in which the oxidation catalyst essentially comprises an oxide of vanadium.

12. The process as set forth in claim 3, in which the oxidation catalyst essentially comprises oxides of vanadium and iron.

13. The process of separating 3-picoline from co-present 4-picoline, which consists in subjecting a mixture of 3-picoline and 4-picoline to catalytic partial-oxidation in vapor phase with air catalyst at elevated temperature in comparison with room temperature.

14. The process as set forth in claim 13, in which the oxidation catalyst essentially comprises an oxide of vanadium.

15. The process as set forth in claim 13, in which the oxidation catalyst essentially comprises oxides of vanadium and iron.

FRANCIS E. CISLAK.
WILLIAM R. WHEELER.

CERTIFICATE OF CORRECTION.

Patent No. 2,300,741.                                                                November 3, 1942.

FRANCIS E. CISLAK, ET AL.

It is hereby certified that error appears in the printed specification of the above numbered patent requiring correction as follows: Page 2, second column, line 60, claim 13, strike out "catalyst"; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.